(12) United States Patent
Park

(10) Patent No.: US 8,780,493 B1
(45) Date of Patent: Jul. 15, 2014

(54) SPINDLE MOTOR AND RECORDING DISK DRIVING DEVICE INCLUDING THE SAME

(71) Applicant: Samsung Electro-Mechanics Co., Ltd., Suwon (KR)

(72) Inventor: Won Ki Park, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/859,995

(22) Filed: Apr. 10, 2013

(30) Foreign Application Priority Data

Feb. 13, 2013 (KR) ........................ 10-2013-0015211

(51) Int. Cl.
*G11B 17/02* (2006.01)

(52) U.S. Cl.
USPC ...................................... 360/99.08

(58) Field of Classification Search
USPC ........................................ 360/99.08
See application file for complete search history.

(56) References Cited

U.S. PATENT DOCUMENTS

| 6,078,466 | A  | * | 6/2000 | Obara ........................ 360/99.08 |
| 6,181,513 | B1 | * | 1/2001 | Obara ........................ 360/99.08 |
| 6,794,774 | B2 | * | 9/2004 | Obara et al. ................ 310/67 R |
| 2010/0142869 | A1 | | 6/2010 | Grantz et al. |
| 2012/0038235 | A1 | | 2/2012 | Jang |
| 2012/0050911 | A1 | | 3/2012 | Tamaoka et al. |

FOREIGN PATENT DOCUMENTS

| JP | 2001-45728 | 2/2001 |
| JP | 2002-199660 | 7/2002 |
| JP | 2004-135467 | 4/2004 |
| JP | 2005-6430 | 1/2005 |
| JP | 2005-261177 | 9/2005 |
| JP | 2009-247122 | 10/2009 |
| JP | 2012-55075 | 3/2012 |
| KR | 10-2010-0064349 | 6/2010 |

OTHER PUBLICATIONS

Japanese Office Action mailed Apr. 22, 2014 in corresponding Japanese Application No. 2013-082353.

* cited by examiner

*Primary Examiner* — Mark Blouin

(57) ABSTRACT

There is provided a spindle motor including a base member including an installation part having a stator core installed on an outer peripheral surface thereof, a lower thrust member insertedly installed in the installation part, a shaft having a lower end portion fixed to the lower thrust member and an upper end portion having a flange part formed thereon, a rotating member including a sleeve forming a bearing clearance with the shaft and the lower thrust member, and a rotor hub extended from the sleeve, and a magnet installation guiding member installed on an inner surface of the rotor hub and guiding an installation position of a driving magnet such that centers of the stator core and the driving magnet coincide with each other in an axial direction, wherein the magnet installation guiding member seals one side of a clamping hole formed in the rotor hub.

10 Claims, 5 Drawing Sheets

SPINDLE MOTOR AND RECORDING DISK DRIVING DEVICE INCLUDING THE SAME

CROSS-REFERENCE TO RELATED APPLICATIONS

This application claims the priority of Korean Patent Application No. 10-2013-0015211 filed on Feb. 13, 2013, in the Korean Intellectual Property Office, the disclosure of which is incorporated herein by reference.

BACKGROUND OF THE INVENTION

1. Field of the Invention

The present invention relates to a spindle motor and a recoding disk driving device including the same.

2. Description of the Related Art

A hard disk drive (HDD), an information storage device, reads data stored on a disk or writes data to a disk using a read/write head.

A hard disk drive requires a disk driving device capable of driving the disk. In the disk driving device, a small-sized spindle motor is used.

Meanwhile, the spindle motor according to the related art requires floatation force for rotating a rotor. In this case, in order to prevent the rotor from being separated from a stator when an amount of force equal to or greater than the floatation force required for rotating the rotor is generated in the spindle motor or an external impact is applied to the spindle motor, a pulling plate has been disposed below a driving magnet to suppress the floatation force.

Alternatively, a configuration in which the pulling plate is omitted and the driving magnet is installed in a rotor hub so that the magnetic center of the driving magnet is disposed at a position higher than that of the magnetic center of a stator core in an axial direction to generate force downwardly in an axial direction, thereby preventing the rotor from being separated from the stator when an amount of force equal to or larger than the floatation force is generated in the spindle motor or the external impact is applied to the spindle motor has been adopted.

However, in the case in which the magnetic centers of the driving magnet and the stator core, that is, the centers of the driving magnet and the stator core are not disposed to coincide with each other in the axial direction, noise and vibrations may occur. Further, in the case in which the driving magnet is installed within the rotor hub, it may be relatively difficult to install the driving magnet at a predetermined position. As a result, manufacturing yield may be deteriorated.

Meanwhile, the rotor hub has a disk mounted thereon. To this end, the rotor hub is provided with a clamp member. In addition, the clamp member may be inserted into a clamp hole of the rotor hub to thereby be fixedly installed therein.

However, at the time of installing the clamp member, foreign objects may be introduced into an internal space of the rotor hub through the clamp hole.

RELATED ART DOCUMENT (Patent Document 1) Japanese Patent Laid-Open Publication No. 2001-45728

SUMMARY OF THE INVENTION

An aspect of the present invention provides a spindle motor capable of sealing a clamp hole of a rotor hub and installing a driving magnet such that centers of the driving magnet and a stator core coincide with each other in an axial direction, and a recording disk driving device including the same.

According to an aspect of the present invention, there is provided a spindle motor including: a base member including an installation part having a stator core installed on an outer peripheral surface thereof; a lower thrust member insertedly installed in the installation part; a shaft having a lower end portion fixed to the lower thrust member and an upper end portion having a flange part formed thereon; a rotating member including a sleeve forming a bearing clearance with the shaft and the lower thrust member, and a rotor hub extended from the sleeve; and a magnet installation guiding member installed on an inner surface of the rotor hub and guiding an installation position of a driving magnet such that centers of the stator core and the driving magnet coincide with each other in an axial direction, wherein the magnet installation guiding member seals one side of a clamping hole formed in the rotor hub.

The magnet installation guiding member may include a sealing part bonded to a lower surface of the rotor hub so as to seal the clamping hole and a guiding part extended from the sealing part to guide the installation position of the driving magnet.

The guiding part may have first and second support surfaces bent to support an upper surface of the driving magnet and the inner surface of the rotor hub.

The sealing part may be in a form of plate having a circular ring shape.

The magnet installation guiding member may include a sealing part bonded to a lower surface of the rotor hub so as to seal the clamping hole, a guiding part extended from the sealing part and bonded to an upper surface of the driving magnet, and a yoke part extended from the guiding part downwardly in the axial direction and having an outer peripheral surface bonded to an inner peripheral surface of the rotor hub.

The magnet installation guiding member may be formed of a magnetic material.

The magnet installation guiding member may be molded by plastic working.

The rotor hub may be provided with an extension wall part forming a labyrinth seal with an outer peripheral surface of the flange part.

The spindle motor may further include a cap member fixedly installed on the extension wall part to prevent leakage of a lubricating fluid.

According to another aspect of the present invention, there is provided a recording disk driving device including: the spindle motor as described above rotating a recording disk; a head transfer part transferring a head detecting information from the recording disk mounted on the spindle motor, to the recording disk; and a housing receiving the spindle motor and the head transfer part therein.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
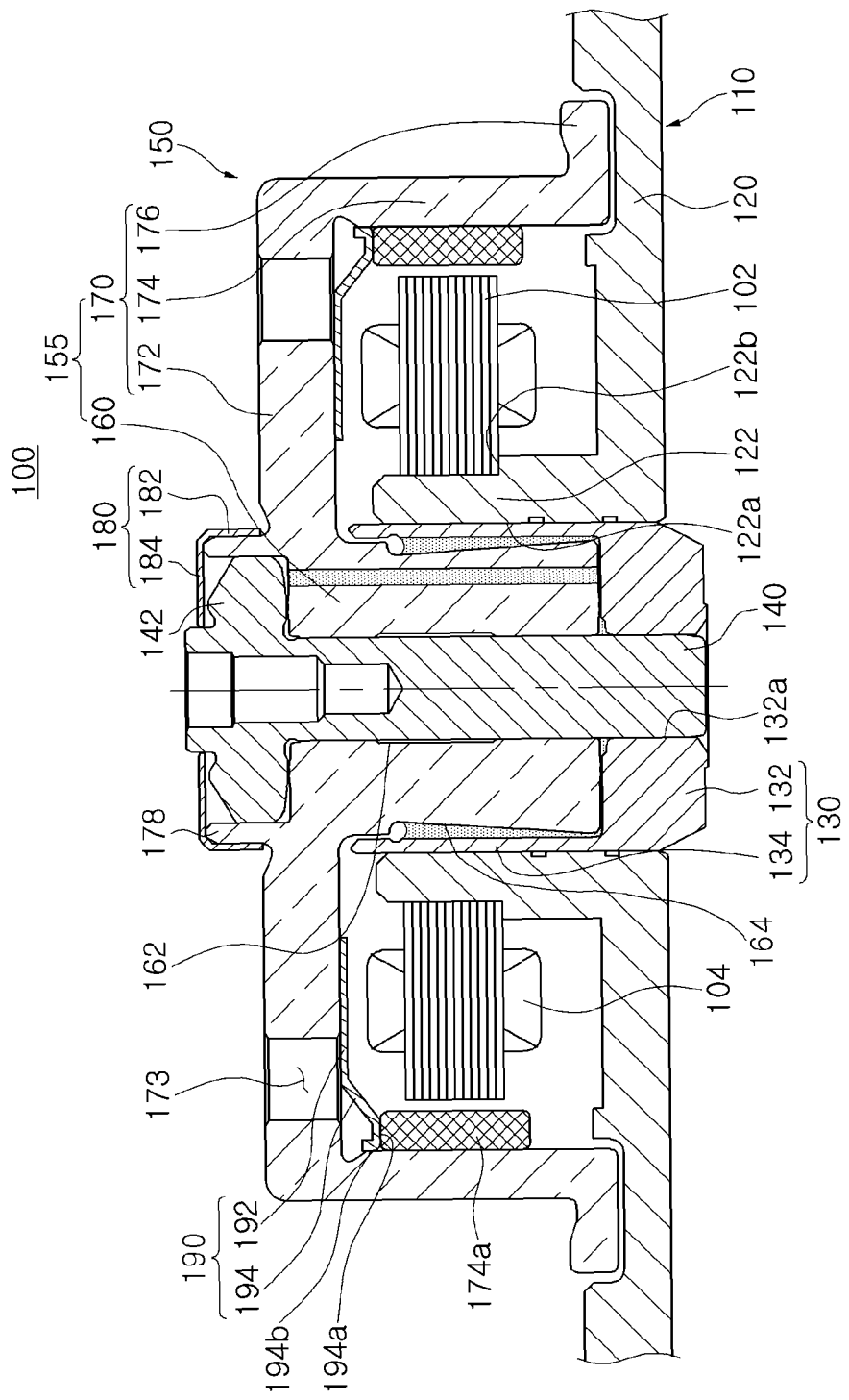
FIG. 1 is a schematic cross-sectional view showing a spindle motor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
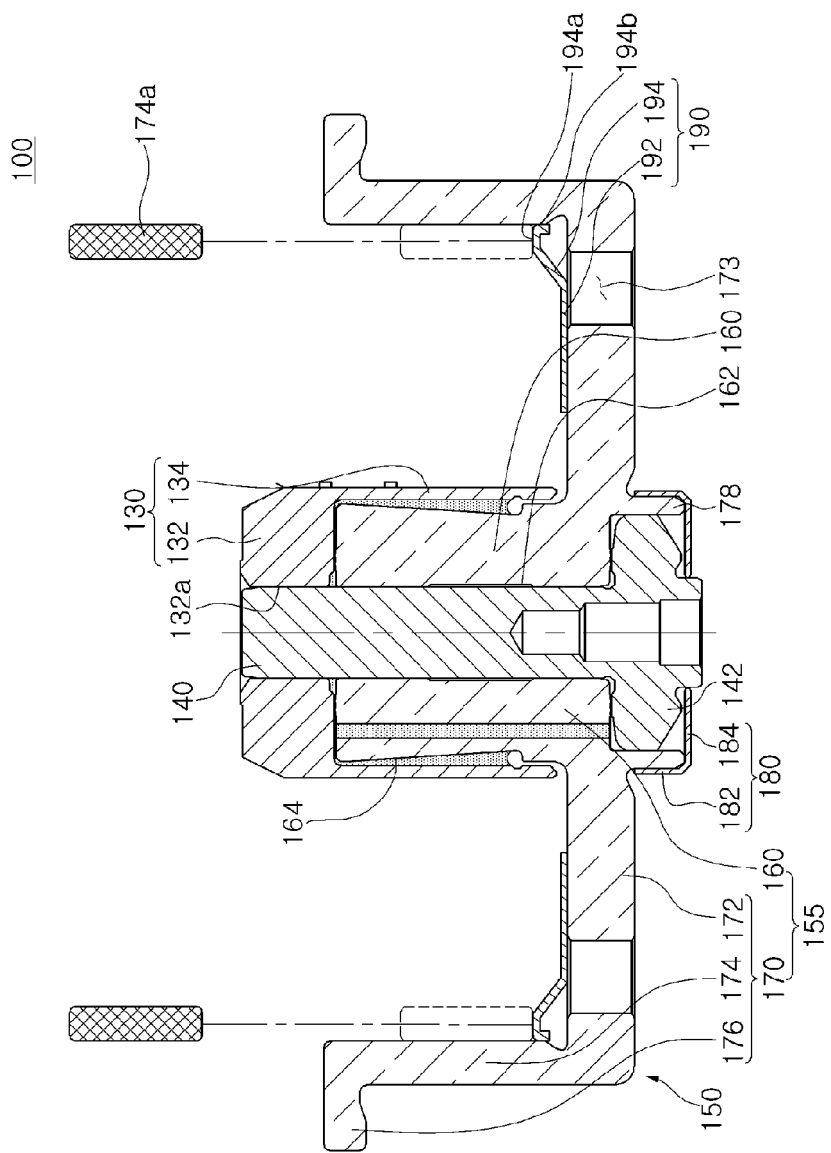
FIG. 2 is a view describing a method of assembling the spindle motor according to the embodiment of the present invention.

FIG. 1 is a schematic cross-sectional view showing a spindle motor according to an embodiment of the present invention. FIG. 2 is a view describing a method of assembling the spindle motor according to the embodiment of the present invention.

Referring to FIGS. 1 and 2, a spindle motor 100 according to the embodiment of the present invention may include a stator 110 and a rotor 150 by way of example.

Meanwhile, the spindle motor 100 according to the embodiment of the present invention may be, for example, a motor used in an information recording and reproducing device such as a hard disk driving device, or the like.

The stator 110 may rotatably support the rotor 150.

Hereinafter, the stator 110 will be described in more detail. The stator 110 may include a base member 120, a lower thrust member 130, and a shaft 140 by way of example.

The base member 120 may include an installation part 122 on which a stator core 102 is installed. The installation part 122 may be provided with an installation hole 122a into which the above-mentioned lower thrust member 130 is inserted, and may be extended upwardly in an axial direction.

Meanwhile, the installation part 122 may have a support surface 122b formed on an outer peripheral surface thereof and supporting the stator core 102. As an example, the stator core 102 may be fixedly installed on the installation part 122 while being seated on the support surface 122b of the installation part 122.

Although the case in which an inner diameter part of the stator core 102 is seated on the installation part 122 of the base member 120 has been described by way of example in the present embodiment, the present invention is not limited thereto. That is, the stator core 102 may also be installed on a separate installation member or the lower thrust member having a shape modified in order to install the stator core 102 thereon. In this case, the base member 120 may do not include the installation part 122.

The lower thrust member 130 may be insertedly disposed in the installation hole 122a of the installation part 122 and may have an outer peripheral surface bonded to an inner peripheral surface of the installation part 122.

Here, the lower thrust member 130 may be fixed to the installation part 122 using at least one of an adhesion scheme, a press-fitting scheme, and a welding scheme.

Meanwhile, the lower thrust member 130 may include a disk part 132 having a disk shape and provided with a through-hole 132a into which a lower end portion of the shaft 140 is inserted and a sealing wall part 134 extended from an edge of the disk part 132 upwardly in the axial direction.

In addition, a distal end portion of the sealing wall part 134 may be disposed to be adjacent to a lower surface of a rotor hub 170 of a rotating member 155, a detailed description of which will be provided below.

In addition, the lower thrust member 130 and the rotating member 155 may form a bearing clearance filled with a lubricating fluid. The sealing wall part 134 and the rotating member 155 may form a sealing part in which an interface (that is, a liquid-vapor interface) between the lubricating fluid and air is formed.

The shaft 140 may have the lower end portion fixed to the lower thrust member 130 and include a flange part 142 formed on an upper end portion thereof.

As an example, the lower end portion of the shaft 140 may be inserted into the through-hole 132a of the lower thrust member 130 to thereby be fixedly installed in the lower thrust member 130. That is, the spindle motor 100 according to the embodiment of the present invention may have a fixed shaft structure in which the shaft 140 is fixedly installed in the motor.

Meanwhile, the shaft 140 and the rotating member 155 may form a bearing clearance filled with a lubricating fluid. Further, a lower surface of the flange part 142 of the shaft 140 may form, together with the rotating member 155, a sealing part in which a liquid-vapor interface is formed.

In addition, the rotor 150, a fixed member rotatably supported by the stator 110, may include the rotating member 155, a cap member 180, and a magnet installation guiding member 190.

The rotating member 155 may include a sleeve 160 forming, together with the lower thrust member 130 and the shaft 140, the bearing clearance, and the rotor hub 170 extended from the sleeve 160.

Here, terms with respect to directions will be defined. As viewed in FIG. 1, an axial direction refers to a vertical direction, that is, a direction from the lower end portion of the shaft 140 toward the upper end portion thereof or a direction from the upper end portion of the shaft 140 toward the lower end portion thereof, while a radial direction refers to a horizontal direction, that is, a direction from the shaft 140 toward an outer peripheral surface of the rotor hub 170 or from the outer peripheral surface of the rotor hub 170 toward shaft 140.

In addition, a circumferential direction refers to a direction of rotation along the outer peripheral surface of the shaft 140.

The sleeve 160 may be disposed between the flange part 142 of the shaft 140 and the disk part 132 of the lower thrust member 130 and form, together with the shaft 140 and the lower thrust member 130, the bearing clearance.

Meanwhile, the sleeve 160 may include a shaft hole 162 formed therein, and the shaft hole 162 has the shaft 140 penetrating therethrough.

In addition, upper and lower radial dynamic pressure grooves (not shown) may be formed in at least one of an inner peripheral surface of the sleeve 160 and the outer peripheral surface of the shaft 140. The upper and lower radial dynamic pressure grooves may be disposed to be spaced apart from each other by a predetermined interval in the axial direction and generate fluid dynamic pressure in the radial direction at the time of rotation of the sleeve 160.

Therefore, the rotating member 155 may be more stably rotated.

Meanwhile, the sleeve 160 may have an inclined surface 164 formed at a lower end portion of an outer peripheral surface thereof in order to form, together with the sealing wall part 134 of the lower thrust member 130, the liquid-vapor interface. Therefore, the interface between the lubricating fluid and the air may be formed in a space formed by the inclined surface 164 and an inner peripheral surface of the sealing wall part 134 by a capillary phenomenon.

In addition, the distal end portion of the sealing wall part 134 may be disposed to be adjacent to the lower surface of the rotor hub 170. Therefore, an upper end portion of the inner peripheral surface of the sealing wall part 134 may be disposed to face an upper end portion of the outer peripheral surface of the sleeve 160. In other words, the upper end portion of the inner peripheral surface of the sealing wall part 134 and the upper end portion of the outer peripheral surface of the sleeve 160 may form a labyrinth seal.

As described above, since the upper end portion of the inner peripheral surface of the sealing wall part 134 and the upper end portion of the outer peripheral surface of the sleeve 160 may form the labyrinth seal, evaporation of the lubricating fluid may be decreased, and leakage of the lubricating fluid may be prevented.

The rotor hub 170 may be extended from the sleeve 160. Meanwhile, although the case in which the rotor hub 170 and the sleeve 160 are formed integrally with each other has been described by way of example in the present embodiment, the present invention is not limited thereto. That is, the rotor hub 170 and the sleeve 160 may be manufactured separately and then coupled to each other.

In addition, the rotor hub 170 may include a body 172 having a disk shape, a magnet mounting part 174 extended from an edge of the body 172 downwardly in the axial direction, and a disk supporting part 176 extended from a distal end of the magnet mounting part 174 in the radial direction.

In addition, the body 172 may include a clamp hole 173 formed therein in order to fixedly install a clamp member (not shown) therein. The clamp hole 173 may be provided in plural and the plurality of clamp holes 173 may be disposed to be spaced apart from each other in the circumferential direction).

In addition, the magnet mounting part 174 may include a driving magnet 174a fixedly installed on an inner surface thereof. Therefore, an inner surface of the driving magnet 174a may be disposed to face a front end of the stator core 102.

Meanwhile, the driving magnet 174a may be a permanent magnet generating magnetic force having a predetermined strength by alternately magnetizing an N pole and an S pole thereof in the circumferential direction.

Here, a rotational driving scheme of the rotating member 155 will be schematically described. When power is supplied to a coil 104 wound around the stator core 102, driving force capable of rotating the rotating member 155 may be generated by electromagnetic interaction between the stator core 102, having the coil 104 wound therearound, and the driving magnet 174a, to rotate the rotating member 155.

That is, the driving magnet 174a and the stator core 102 disposed to face the driving magnet 174a and having the coil 104 wound therearound may electromagnetically interact with each other to rotate the rotating member 155.

Meanwhile, the rotor hub 170 may be provided with an extension wall part 178 for forming, together with an outer peripheral surface of the flange part 142 of the shaft 140, the labyrinth seal. The extension wall part 178 may be extended from a central portion of an upper surface of the body 172 upwardly in the axial direction and have a ring shape.

The cap member 180 may be fixedly installed on the above-mentioned extension wall part 178 to prevent leakage of the lubricating fluid.

Meanwhile, the cap member 180 may include a bonded part 182 having an inner peripheral surface bonded to an outer peripheral surface of the extension wall part 178 and a cover part 184 bent from the bonded part 182 inwardly in the radial direction.

That is, in the case in which the bonded part 182 of the cap member 180 is bonded to the extension wall part 178, the cover part 184 may be disposed over the flange part 142 of the shaft 140 to prevent leakage of the lubricating fluid.

Meanwhile, the cap member 180 is not a necessary component of the spindle motor 100 according to the embodiment of the present invention. Therefore, the cap member 180 may be omitted. In other words, the cap member 180 may not be included in the spindle motor 100 according to the embodiment of the present invention.

The magnet installation guiding member 190 may be installed on an inner surface of the rotor hub 170 and guide an installation position of the driving magnet 174a such that the centers of the stator core 102 and the driving magnet 174a coincide with each other in the axial direction.

In addition, the magnet installation guiding member 190 may serve to seal one side of the clamping hole 173 formed in the rotor hub 170.

To this end, the magnet installation guiding member 190 may include a sealing part 192 bonded to the lower surface of the rotor hub 170 so as to seal the clamping hole 173 and a guiding part 194 extended from the sealing part 192 to guide the installation position of the driving magnet 174a.

Meanwhile, a portion of the guiding part 194 connected to the sealing part 192 may be inclined, and the guiding part 194 may have first and second support surfaces 194a and 194b bent to support an upper surface of the driving magnet 174a and the inner surface of the rotor hub 170.

In addition, the sealing part 192 may be in the form of a plate having a circular ring shape.

Next, a method of mounting the driving magnet 174a will be described with reference to FIG. 2. First, the magnet installation guiding member 190 may be installed on the inner surface of the rotor hub 170. In this case, the sealing part 192 may contact the lower surface of the rotor hub 170, and the second support surface 194b of the guiding part 194 may contact the inner surface of the magnet mounting part 174.

Therefore, one side of the clamping hole 173 formed in the body 172 may be sealed by the sealing part 192.

Then, the driving magnet 174a may be mounted on the inner surface of the magnet mounting part 174 such that the upper surface of the driving magnet 174a having the circular ring shape contacts the first support surface 194a of the guiding part 194.

As described above, the driving magnet 174a is merely mounted on the magnet mounting part 174 such that the upper surface of the driving magnet 174a contacts the first support surface 194a of the guiding part 194, whereby the centers of the driving magnet 174a and the stator core 102 may coincide with each other in the axial direction.

In other words, the driving magnet 174a may be installed on the magnet mounting part 174 such that the magnetic centers of the driving magnet 174a and the stator core 102 coincide with each other through the magnet installation guiding member 190.

Further, one side of the clamping hole 173 formed in the body 172 of the rotor hub 170 may be sealed through the magnet installation guiding member 190 to prevent foreign objects generated at the time of mounting the clamp member (not shown) from being introduced into an internal space of the rotor hub 170.

Meanwhile, the magnet installation guiding member 190 may be formed of a non-magnetic material and may be molded by performing press working on a thin, soft plate.

However, the magnet installation guiding member 190 is not limited to being manufactured by the above-mentioned method, but may be manufactured by various molding methods such as an injection-molding method, and the like.

As described above, the driving magnet 174a may be installed in such a manner that the centers of the driving magnet 174a and the stator core 102 coincide with each other in the axial direction while simultaneously sealing the clamp hole 173 by the magnet installation guiding member 190.

Therefore, the introduction of the foreign objects generated at the time of installing the clamp member (not shown) in the internal space formed by the rotor hub 170 and the base member 120 may be prevented.

In addition, since the driving magnet 174a is installed such that the centers of the driving magnet 174a and the stator core 102 coincide with each other in the axial direction, the generation of noise and vibrations may be decreased and driving torque may be increased.

Further, since a length of the driving magnet 174a in the axial direction may be decreased, manufacturing costs may be decreased.

Hereinafter, a spindle motor according to another embodiment of the present invention will be described with reference to the accompanying drawings. Components the same as those of previous embodiments will be denoted by the same reference numerals and detailed descriptions thereof will be omitted.

Figure 3:
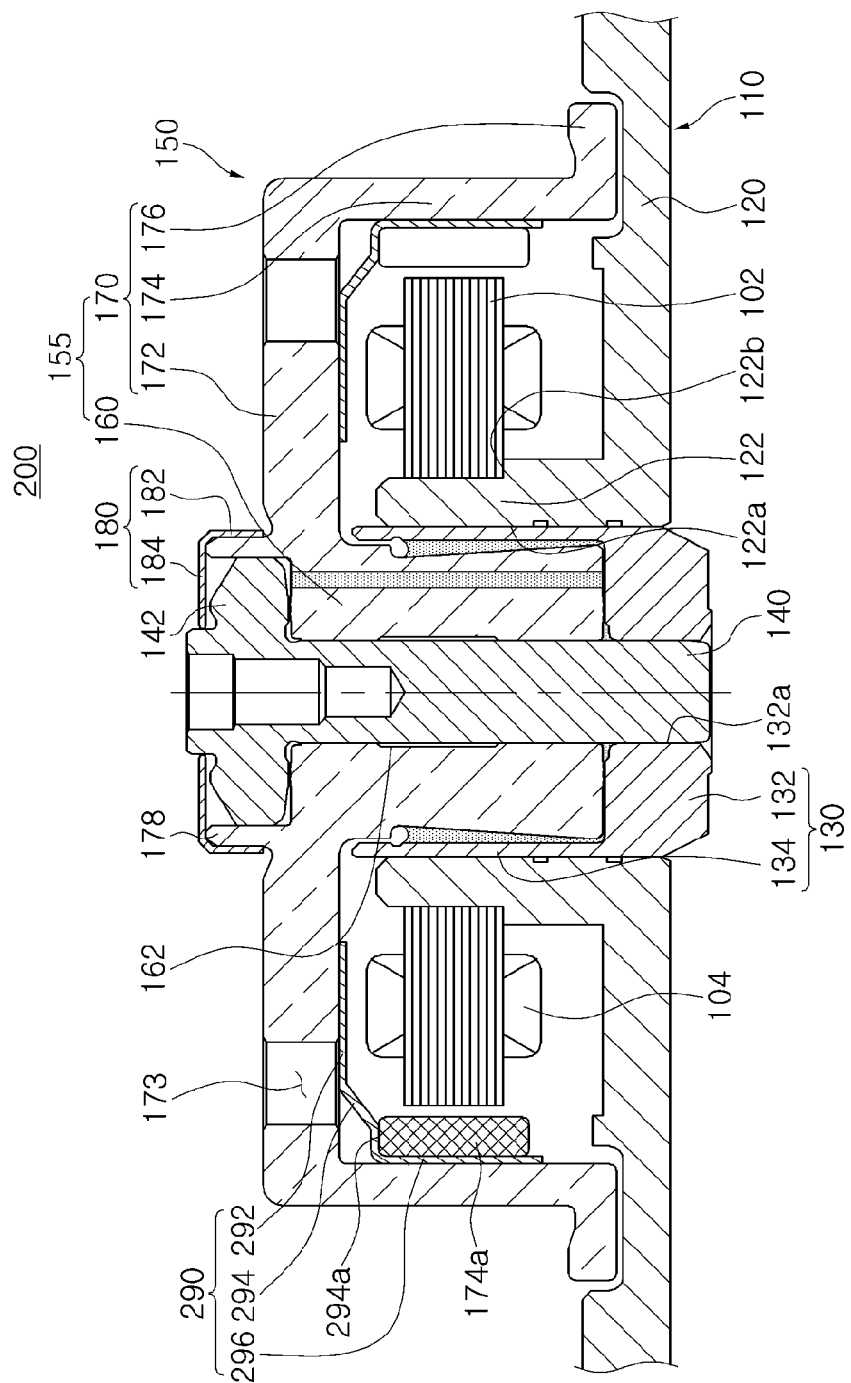
FIG. 3 is a schematic cross-sectional view showing a spindle motor according to another embodiment of the present invention.
Figure 4:
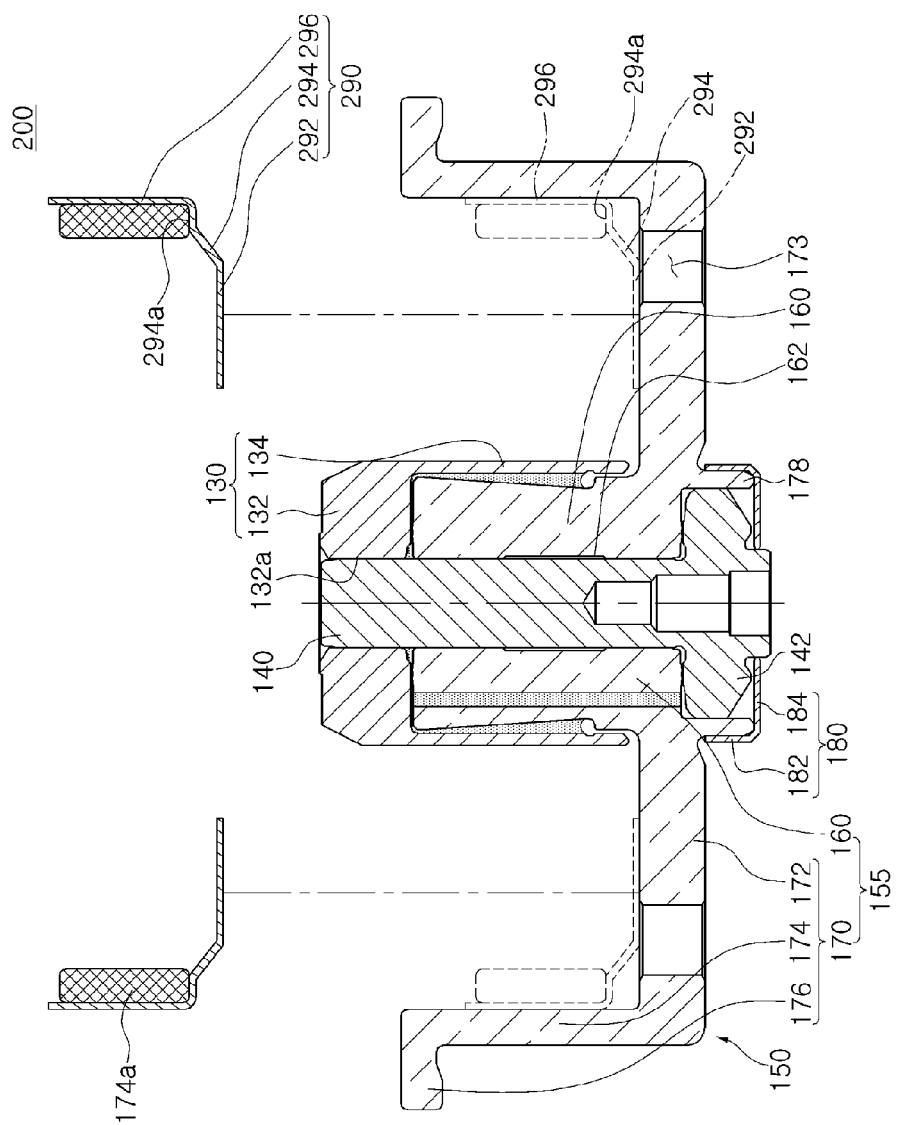
FIG. 4 is a view describing a method of assembling the spindle motor according to another embodiment of the present invention.

FIG. 3 is a schematic cross-sectional view showing a spindle motor according to another embodiment of the present invention. FIG. 4 is a view describing a method of assembling the spindle motor according to another embodiment of the present invention.

Referring to FIGS. 3 and 4, a spindle motor 200 according to another embodiment of the present invention may include the stator 110 and the rotor 150 by way of example.

In addition, the stator 110 may include the base member 120, the lower thrust member 130, and the shaft 140.

Further, the rotor 150 may include the rotating member 155, the cap member 180, and a magnet installation guiding member 290.

Meanwhile, the base member 120, the lower thrust member 130, the shaft 140, the rotating member 155, and the cap member 180 are the same as those of the spindle motor according to the embodiment of the present invention described above. Therefore, a description thereof will be omitted.

Hereinafter, the magnet installation guiding member 290 will be described.

The magnet installation guiding member 290 may be installed on the inner surface of the rotor hub 170 and guide an installation position of the driving magnet 174a such that the centers of the stator core 102 and the driving magnet 174a coincide with each other in the axial direction.

In addition, the magnet installation guiding member 290 may serve to seal one side of the clamping hole 173 formed in the rotor hub 170.

To this end, the magnet installation guiding member 290 may include a sealing part 292 bonded to the lower surface of the rotor hub 170 so as to seal the clamping hole 173, a guiding part 294 extended from the sealing part 292 to guide the installation position of the driving magnet 174a, and a yoke part 296 extended from the guiding part 294 downwardly in the axial direction and having an outer peripheral surface bonded to the inner peripheral surface of the rotor hub 170.

Meanwhile, a portion of the guiding part 294 connected to the sealing part 292 may be inclined, and the guiding part 294 may have a first support surface 294a bent to support the upper surface of the driving magnet 174a.

In addition, the magnet installation guiding member 290 may be formed of a magnetic material to prevent leakage of magnetic flux density. In other words, a magnetic field generated from the driving magnet 174a may be concentrated on the stator core 102 due to the yoke part 296.

In addition, the sealing part 292 may be in the form of a plate having a circular ring shape.

Next, a method of mounting the driving magnet 174a will be described with reference to FIG. 4. First, the driving magnet 174a may be mounted on the magnet installation guiding member 290. In this case, the upper surface of the driving magnet 174a may contact the first support surface 294a, and the outer peripheral surface thereof may be bonded to the inner peripheral surface of the yoke part 296.

Then, the magnet installation guiding member 290 may be mounted on the inner surface of the rotor hub 170.

Therefore, one side of the clamping hole 173 formed in the body 172 may be sealed by the sealing part 292.

As described above, the magnet installation guiding member 290 is merely installed on the rotor hub 170, whereby the centers of the driving magnet 174a and the stator core 102 may coincide with each other in the axial direction.

In other words, the driving magnet 174a may be installed on the magnet mounting part 174 such that the magnetic centers of the driving magnet 174a and the stator core 102 coincide with each other through the magnet installation guiding member 290.

Further, one side of the clamping hole 173 formed in the body 172 of the rotor hub 170 may be sealed through the magnet installation guiding member 290 to prevent foreign objects generated at the time of mounting the clamp member (not shown) from being introduced into an internal space of the rotor hub 170.

Meanwhile, the magnet installation guiding member 290 may be molded by performing press working on a thin soft plate.

However, the magnet installation guiding member 290 is not limited to being manufactured by the above-mentioned method, but may be manufactured by various molding methods such as an injection-molding method, and the like.

As described above, the driving magnet 174a may be installed such that the centers of the driving magnet 174a and the stator core 103 coincide with each other in the axial direction while simultaneously sealing the clamp hole 173 by the magnet installation guiding member 290.

Therefore, the introduction of the foreign objects generated at the time of installing the clamp member (not shown) into the internal space formed by the rotor hub 170 and the base member 120 may be prevented.

In addition, since the driving magnet 174a is installed such that the centers of the driving magnet 174a and the stator core 102 coincide with each other in the axial direction, the generation of noise and vibrations may be decreased and driving torque may be increased.

Further, since a length of the driving magnet 174a in the axial direction may be decreased, manufacturing costs may be decreased.

Further, leakage of magnetic flux is decreased through the yoke part 296 of the magnet installation guiding member 290, whereby the driving torque may be further increased.

Hereinafter, a recording disk driving device according to the embodiment of the present invention will be described with reference to the accompanying drawings.

Figure 5:
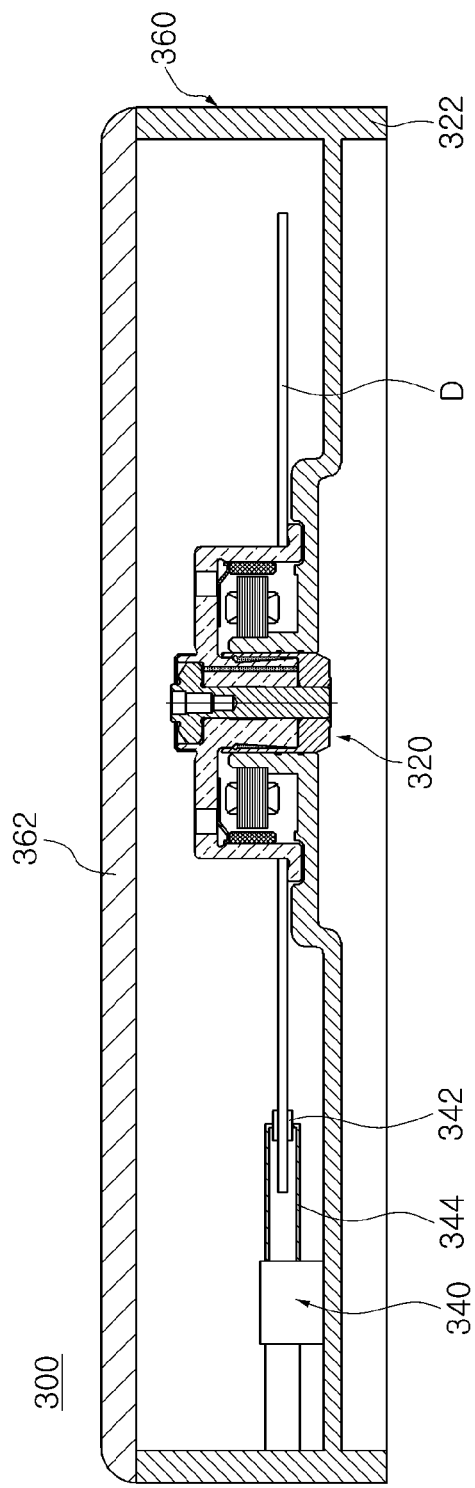
FIG. 5 is a schematic cross-sectional view showing a recording disk driving device according to an embodiment of the present invention.

FIG. 5 is a schematic cross-sectional view showing a recording disk driving device according to the embodiment of the present invention.

Referring to FIG. 5, a recording disk driving device 300 according to the embodiment of the present invention may be a hard disk drive and include a spindle motor 320, a head transfer part 340, and a housing 360.

The spindle motor 320 may be any one of the spindle motor 100 according to an embodiment of the present invention, and the spindle motor 200 according to another embodiment of the present invention as described above, and may have a recording disk D mounted thereon.

The head transfer part 340 may transfer a head 342 detecting information from the recording disk D mounted on the spindle motor 320 to a surface of the recording disk D from which the information is to be detected. The head 342 may be disposed on a support part 344 of the head transfer part 340.

The housing 360 may include a base member 322 and a top cover 362 shielding an upper portion of the base member 322 in order to form an internal space for receiving the spindle motor 320 and the head transfer part 340.

As set forth above, according to the embodiments of the present invention, the driving magnet may be installed such that the centers of the driving magnet and the stator core coincide with each other in the axial direction while simultaneously sealing the clamp hole by the magnet installation guiding member.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
   a base member including an installation part having a stator core installed on an outer peripheral surface thereof;
   a lower thrust member insertedly installed in the installation part;
   a shaft having a lower end portion fixed to the lower thrust member and an upper end portion having a flange part formed thereon;
   a rotating member including a sleeve forming a bearing clearance with the shaft and the lower thrust member, and a rotor hub extended from the sleeve; and
   a magnet installation guiding member installed on an inner surface of the rotor hub and guiding an installation position of a driving magnet such that centers of the stator core and the driving magnet coincide with each other in an axial direction,
   wherein the magnet installation guiding member seals one side of a clamping hole formed in the rotor hub.

2. The spindle motor of claim 1, wherein the magnet installation guiding member includes a sealing part bonded to a lower surface of the rotor hub so as to seal the clamping hole and a guiding part extended from the sealing part to guide the installation position of the driving magnet.

3. The spindle motor of claim 2, wherein the guiding part has first and second support surfaces bent to support an upper surface of the driving magnet and the inner surface of the rotor hub.

4. The spindle motor of claim 2, wherein the sealing part is in a form of plate having a circular ring shape.

5. The spindle motor of claim 1, wherein the magnet installation guiding member includes a sealing part bonded to a lower surface of the rotor hub so as to seal the clamping hole, a guiding part extended from the sealing part and bonded to an upper surface of the driving magnet, and a yoke part extended from the guiding part downwardly in the axial direction and having an outer peripheral surface bonded to an inner peripheral surface of the rotor hub.

6. The spindle motor of claim 5, wherein the magnet installation guiding member is formed of a magnetic material.

7. The spindle motor of claim 1, wherein the magnet installation guiding member is molded by plastic working.

8. The spindle motor of claim 1, wherein the rotor hub is provided with an extension wall part forming a labyrinth seal with an outer peripheral surface of the flange part.

9. The spindle motor of claim 8, further comprising a cap member fixedly installed on the extension wall part to prevent leakage of a lubricating fluid.

10. A recording disk driving device comprising:
    the spindle motor of claim 1 rotating a recording disk;
    a head transfer part transferring a head detecting information from the recording disk mounted on the spindle motor, to the recording disk; and
    a housing receiving the spindle motor and the head transfer part therein.

* * * * *